United States Patent
Tsubouchi et al.

[11] 3,877,490
[45] Apr. 15, 1975

[54] STEEL PIPES PROVIDED WITH PLASTIC COATINGS

[75] Inventors: Yoshio Tsubouchi, Yokohama; Noboru Shima, Kawasaki; Hiroyuki Tanabe, Yokohama, all of Japan

[73] Assignee: Nippon Kokan Kabushiki Kaisha, Tokyo, Japan

[22] Filed: June 8, 1973

[21] Appl. No.: 368,127

[30] Foreign Application Priority Data
July 25, 1972 Japan................................ 47-73852

[52] U.S. Cl................. 138/141; 138/145; 285/50; 138/DIG. 6
[51] Int. Cl................................................. F16l 9/14
[58] Field of Search........... 138/141, 142, 145, 143, 138/155, 140, 118, 124, 125, DIG. 6, DIG. 7; 285/45, 55, 50, 21, 423, DIG. 16; 260/897 A

[56] References Cited
UNITED STATES PATENTS
3,070,557  12/1962  Gessler et al................... 260/897 A
3,410,816  11/1968  Mirabile et al..................... 260/874
3,415,287  12/1968  Heslop et al..................... 138/141 X
3,744,823  7/1973  Muir et al........................ 285/423 X Primary Examiner—Richard C. Queisser
Assistant Examiner—Daniel M. Yasich
Attorney, Agent, or Firm—Flynn & Frishauf

[57] ABSTRACT

In a steel pipe provided with a corrosion resistant layer of plastic and a protective layer of plastic applied onto the corrosion resistant layer through an intermediate layer of an antifusion agent, the antifusion agent comprises a mixture of two or more synthetic resins of the polyolefin series. The synthetic resins have lower molecular weight than the plastics utilized to form the corrosion resistant layer and the protective layer and solidify at room temperature to form a film.

3 Claims, 3 Drawing Figures

STEEL PIPES PROVIDED WITH PLASTIC COATINGS

BACKGROUND OF THE INVENTION

This invention relates to an improved steel pipe provided with a plastic coating, more particularly with a corrosion resistant layer of plastic and a protective layer of plastic overlying the corrosion resistant layer.

AS shown in FIG. 1, a prior art steel pipe provided with a plastic coating comprises a steel pipe 1, an adhesive layer 2, a corrosion resistant layer 3 of plastic bounded to the peripheral surface of the steel pipe, and a protective layer 4 of plastic overlying the corrosion resistant layer 3. When interconnecting the ends of two steel pipes 1 of this construction as by welding it is necessary to peel off the protective layer 4 from the corrosion resistant layer 3, remove the end portions of the corrosion resistant layers to expose the ends of the steel pipes and then reapply a new corrosion resistant layer 5 of plastic to cover the exposed ends of the pipes and the joint 6. However, with the prior art construction, it is extremely difficult to peel off the protective layer 4 because it is fused to the corrosion resistant layer 3 by the heat which is applied at the time of forming the protective layer. Moreover, where the protective layer and corrosion resistant layer are made of plastics of different type, or of a plastic of the same type but of different degree of polymerization, or where the surface of the protective layer is irregular, stress is formed at the fused portion thus causing a stress cracking phenomenon. This will form defects in either one or both of the protective and corrosion resistant layers.

In order to make easy the peel off and to avoid the stress cracking phenomenon we have proposed a solution in which an antifusion agent of polybutene is interposed between the corrosion resistant layer and the protective layer. However, the antifusion agent consisting of polybutene exhibits a lubricating effect as the temperature increases so that when the coated steel pipe is transferred, hung up or moved obliquely, a slippage will be created between the protective layer and the corrosion resistant layer thus making the operation difficult and dangerous. Furthermore, the viscosity of polybutene decreases with increase in temperature so that the polybutene leaking out from the end of the coated pipe contaminates the end portion of the pipe. As such leaked out polybutene is adhesive it is difficult to remove it.

The antifusion agent of the present invention differs from under coatings of the prior art, and has the following excellent advantages. The antifusion agent to be interposed between the plastic corrosion resistant layer and the plastic protective layer is required not only to prevent the fusion between the corrosion resistant layer and the protective layer but also not to affect the plastic layers, can prevent slippage therebetween, permits ready peel off of the protective layer from the corrosion resistant layer, does not cause the stress cracking phenomenon in both layers and is stable against variation in the ambient temperature.

SUMMARY OF THE INVENTION

It is an object of this invention to provide an improved steel pipe provided with a corrosion resistant layer of plastic and a protective layer of plastic bonded to the corrosion resistant layer through an improved antifusion agent having desired characteristics enumerated above.

The novel antifusion agent of this invention comprises a homogeneous mixture of two or more of plastics of the olefine series which have lower molecular weight than the plastics utilized to form the corrosion resistant layer and the protective layer. The agent solidifies at room temperature to form a film. It has suitable adhesiveness. It comprises one or more of a heavy paraffin oil, polybutene, polypropylene and polyethylene. By utilizing such an antifusion agent it is possible to prevent the slippage between the corrosion resistant layer and the protective layer which has been inevitable when a steel pipe having corrosion resistance and protective layers which are bonded together with such an antifusion agent as polybutene is transferred, hung up or moved obliquely. By adjusting the softening point of the antifusion agent it is possible to prevent the slippage between the corrosion proof and protective layers caused by a rise in the ambient temperature and by the heat of the fluid conveyed through the pipe. Furthermore, the steel pipes embodying the invention are easy to install.

DESCRIPTION OF THE PREFERRED EMBODIMENTS

Figure 1:
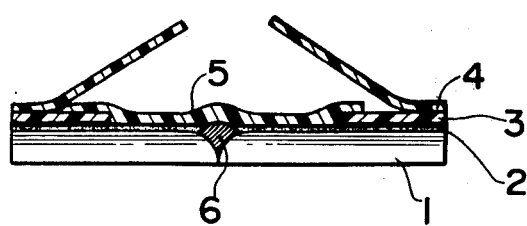
FIG. 1 shows a partial longitudinal sectional view showing a manner of connecting conventional pipes provided with plastic coatings.
Figure 2:
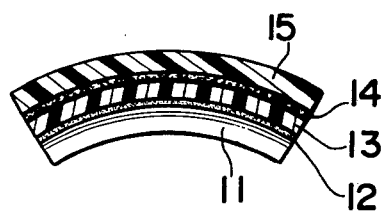
FIG. 2 shows a partial cross-sectional view of a steel pipe embodying the invention.
Figure 3:
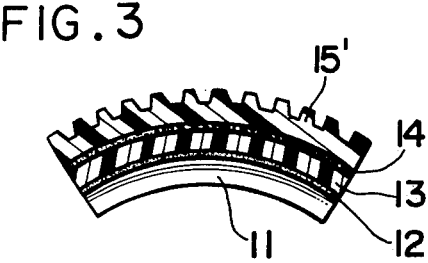
FIG. 3 is a partial cross-sectional view of a modified steel pipe.

Referring now to FIGS. 2 and 3, a steel pipe 11 is provided with a layer 2 of an adhesive applied thereon by a suitable coating method, a corrosion resistant layer 13 of plastic extruded on the adhesive layer by extrusion, for instance, a layer of antifusion agent 14 applied on the corrosion resistant layer 13 and a protective layer of plastic extruded on the layer of antifusion agent. The constructions of FIGS. 2 and 3 are different in that the surface of the protective layer 15 is smooth in the case FIG. 2 whereas the surface of the protective layer 15 is corrugated 15' in the case of FIG. 3. In these examples, the corrosion resistant layer and the protective layer are made of polyolefins whose molecular weights are above 10,000. However, it should be understood that any equivalent plastics can also be used.

Although not limited, thereto, preferred compositions of the novel antifusion agent are as follows.

| Example 1: | polybutene | 30% | by weight |
|---|---|---|---|
| | polypropylene | 70% | " |
| Example 2: | polybutene | 33% | " |
| | polypropylene | 57% | " |
| | polyethylene | 10% | " |
| Example 3: | polypropylene | 70% | " |
| | polyethylene | 30% | " |
| Example 4: | polypropylene | 45% | " |
| | polyethylene | 5% | " |
| | heavy paraffin oil | 50% | " |

Molecular weight of each component in said antifusion agent is as follows:

| Component | Molecular Weight |
| --- | --- |
| polyethylene | 500 – 2,000 |
| polypropylene | 2,000 – 8,000 |
| polybutene | 200 – 1,500 |

An example of manufacturing the novel steel pipe is as follows:

First, the adhesive layer 12 is coated on the steel pipe 11 and then the corrosion resistant layer 13 of polyethylene is extruded under a high pressure to cover the adhesive layer 12. Then, either one of the antifusion agents of Examples 1 to 4 is heated to a temperature of 100°C and more and the molten antifusion agent is coated on the corrosion resistant layer 13 to a thickness of from 50 to 300 microns. Thereafter, a protective layer 15 of polyethylene is extruded under a high pressure to cover the layer of antifusion agent 14.

The steel pipes provided with plastic coatings applied as above described were hung obliquely and shaped into bent pipes each having a radius of curvature equal to 40 times of the diameter of the pipe. In each case, no slippage between the corrosive resistant layer and the protective layer was noted. When these coated pipes were dipped in a thermostatic bath maintained at 60°C for a long period, was no antifusion agent flowed out from the ends of the pipes. Furthermore, when repairing the pipe ends in the field it was possible to readily peel off the protective layer.

The physical characteristics of the antifusion agents shown in the above examples are as follows. Commercial polyethylene was subjected to a stress cracking test, and it was noted that no crack was formed up to 1,000 hours.

| | | |
| --- | --- | --- |
| specific gravity | | 0.87 |
| flash point | | 240°C |
| softening point | | 133°C |
| degree of needle penetration | 25°C | 80 |
| | 130°C | 1250 |
| viscosity | 150°C | 480 cp |
| | 180°C | 190 cp |

The novel steel pipes provided with plastic coatings have the following advantages.

1. Since the antifusion agent has a substantial viscosity and is a solid at room temperature, no slippage occurs between the corrosion resistant layer and the protective layer when the pipes are installed in the field in a usual manner.

2. At normal temperature of the atmosphere, the antifusion agent does not soften and flow out.

3. No stress cracking is formed where polyethylene is used.

4. Since it is possible to use such economic synthetic resins of low molecular weight of the polyolefin series as polypropylene, the cost of the antifusion agent is low and is much lower when heavy paraffin oil is used.

5. It is possible to completely prevent the fusion between the corrosion resistant layer and the protective layer.

6. Since the antifusion agent comprises a mixture of two or more than two of synthetic resins of the polyolefin series, the antifusion agent itself has high corrosion resistant property that can be comparable with that of conventional corrosion resistant coating materials.

7. Since the layer of the antifusion agent has higher light transmissionability than the prior art under coatings, the color of the corrosion resistant layer can be seen, thus improving the appearance of the pipe.

While the invention has been shown and described in terms of some preferred embodiments thereof it should be understood that many changes and modifications will be obvious to one skilled in the art without departing from the true spirit and scope of the invention as defined in the appended claims.

What is claimed is:

1. In a steel pipe provided with a corrosion resistant layer of plastic and a protective layer of plastic applied onto said corrosion resistant layer through an intermediate coextensive layer of an antifusion agent, the improvement wherein said antifusion agent comprises a mixture of two or more of synthetic resins of the polyolefin series, said mixture of synthetic resins having lower molecular weight than said plastics forming said corrosion resistant layer and said protective layer and solidifying at room temperature to form a film whereby fusion and slippage between the layers of plastic is prevented.

2. The steel pipe according to claim 1 wherein said antifusion agent comprises a mixture of two or more of synthetic resins of the polyolefin series and a heavy paraffin oil.

3. The steel pipe according to claim 1 wherein said synthetic resins of the polyolefin series are selected from the group consisting of polyethylene of molecular weight of 500–2,000, polypropylene of molecular weight of 2,000–8,000 and polybutene of molecular weight of 200–1,500.

* * * * *